United States Patent
Ha

(10) Patent No.: US 6,462,655 B1
(45) Date of Patent: Oct. 8, 2002

(54) ZONE CHECK TEST SYSTEM

(75) Inventor: Simon Ha, Aurora, IL (US)

(73) Assignee: Pittway Corporation, Chicago, IL (US)

( * ) Notice: Subject to any disclaimer, the term of this patent is extended or adjusted under 35 U.S.C. 154(b) by 0 days.

(21) Appl. No.: 09/438,235

(22) Filed: Nov. 12, 1999

(51) Int. Cl.$^7$ .............................. G08B 29/00; F17D 3/00
(52) U.S. Cl. ....................... 340/514; 340/515; 340/603; 340/606; 702/45; 702/50; 137/551
(58) Field of Search ................................. 340/514, 515, 340/603, 606; 137/551; 700/282, 284; 702/45, 50

(56) References Cited

U.S. PATENT DOCUMENTS

| | | | | | |
|---|---|---|---|---|---|
| 4,523,452 A | * | 6/1985 | Brayman | ................ | 73/861.08 |
| 4,725,964 A | * | 2/1988 | Lloyd et al. | ............. | 73/861.08 |
| 5,680,329 A | * | 10/1997 | Lloyd et al. | ................ | 137/551 |
| 5,864,287 A | * | 1/1999 | Evans, Jr. et al. | .......... | 340/506 |

* cited by examiner

*Primary Examiner*—Donnie L. Crosland
(74) *Attorney, Agent, or Firm*—Welsh & Katz, Ltd.

(57) ABSTRACT

A fluid flow detector test system includes a flow conduit and a pump for providing a test fluid flow at the detector. A test unit includes a programmed processor coupled to the pump by a drive circuit such as a solid state switch or a relay. The detector's output is coupled to an input port of the processor. To initiate a test, executable instructions, coupled to the processor, enable the processor to energize the pump, creating a test fluid flow. The processor senses the detector's output to evaluate its test performance. An alarm system having a plurality of detectors can include a plurality of such test systems, one coupled to each detector.

48 Claims, 3 Drawing Sheets

ZONE CHECK TEST SYSTEM

FIELD OF THE INVENTION

The invention pertains to fire alarm systems. More particularly, the invention pertains to testable flow detection systems wherein the presence of flow is often indicative of an alarm or fire condition.

BACKGROUND OF THE INVENTION

One form of known fire alarm system includes waterflow conduits or pipes which are coupled to sprinkler heads. The sprinkler heads contain a heat sensitive material. In the presence of elevated temperature, such as caused by a fire, the material in the sprinkler heads melts and water, under pressure in the pipes or conduits, sprays from the sprinkler heads to suppress the fire in the adjacent area.

It is also known to incorporate flow detectors into the conduits of such suppression systems. Examples of such flow detectors can be found in Merchant U.S. Pat. No. 4,782,333 as well as Griess U.S. Pat. No. 4,791,414, both of which are assigned to the assignee hereof. Such flow detectors conventionally include a sensor which extends into the respective pipe or conduit and which is moved from a quiescent position to an active position in response to a waterflow in the pipe or conduit. This movement produces an output signal indicative of the flow of water which is also associated with the presence of a fire condition.

A problem has been recognized with respect to such flow detectors in that they usually remain in a quiescent state for long periods of time due to the absence of an alarm or fire condition. However, such detectors are expected to function properly in the presence of flow, which is of course indicative of the presence of a fire or an alarm condition, notwithstanding long intervals which could be months or years without any fire conditions.

It would be desirable therefore to be able to provide a test system for flow detectors which could be used to conduct a variety of different tests of the respective detector on a routine basis and in the absence of an emergency or fire condition. Preferably, it would be possible to interconnect the units for a plurality of detectors such that groups of detectors could be tested at essentially the same time.

SUMMARY OF THE INVENTION

A test unit for a fluid flow detector includes a programmed processor which executes a set of preloaded instructions for carrying out one or more tests of an associate flow detector. An auxiliary water pump can be used to provide a flow of test fluid to actuate the detector. Output drive circuitry is coupled between the programmed processor and the pump such that the pump operates under the control of the programmed processor. Output drive circuitry can be implemented using relays or solid state drive circuits.

An input port of the processor can be coupled to the signal output port from the respective detector. The processor can include a second input port, for example from another identical test unit, when the test units are grouped together with a group of flow detectors. The test units can also include a manually operable control element, such as a multi-position key switch or keyboard for purposes of carrying out locally controlled tests.

In one instance, the executable instructions in the processor, in connection with a timer or a real time clock included in the processor, can activate the output circuitry periodically, for example every several days, for a brief period of time, on the order of 300 milliseconds, for purposes of minimizing pump impeller junk or crud buildup. In another mode, the processor can activate the circuitry continuously to conduct a test of the respective detector.

In a group test mode, placing one of the test units in the group test mode transmits a signal to each of the other units in the group whereupon all of the units in the group energize their respective water pumps and sense test indicating signals from the respective detectors substantially at the same time. Alternately, the units can function sequentially with each member of the group carrying out its test sequence depending upon its position in the group.

Numerous other advantages and features of the present invention will become readily apparent from the following detailed description of the invention and the embodiments thereof, from the claims and from the accompanying drawings.

BRIEF DESCRIPTIONS OF THE DRAWINGS

DETAILED DESCRIPTION OF THE PREFERRED EMBODIMENTS

Figure 1:
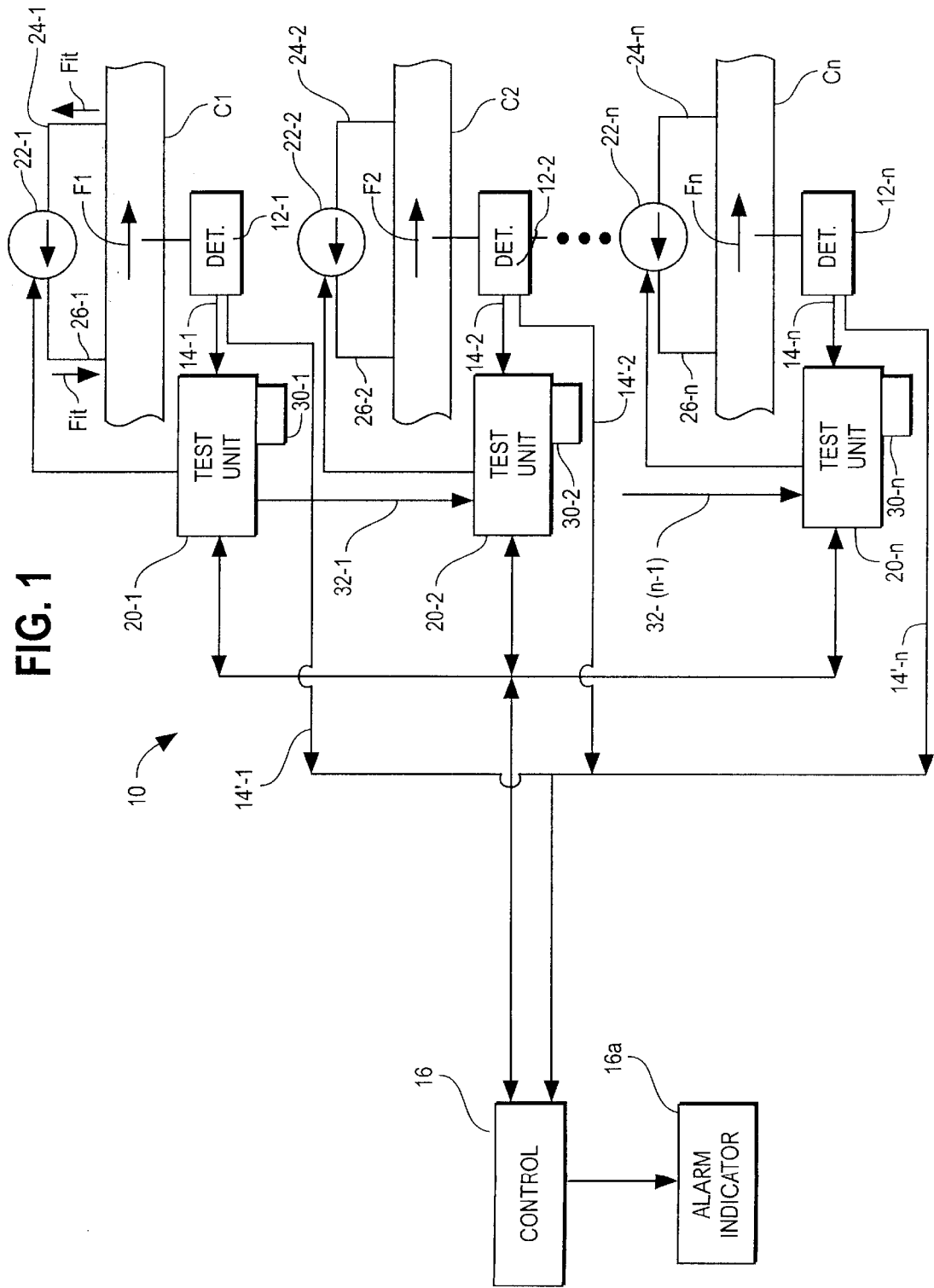
FIG. 1 is an over-all block diagram of an alarm system in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates a system 10 which embodies the present invention. In FIG. 1, waterflow conduits C1, C2 . . . Cn of a type that might be found in a building fire alarm system are each connected to a respective sprinkler head (not shown). As is conventional, in the presence of heat, the respective sprinkler head or heads become activated whereupon fluid in each of the respective conduits Ci flows under pressure, indicated at F1, F2 . . . Fn through the activated sprinkler head to suppress the fire in the respective region.

FIG. 1 also illustrates a plurality of flow detectors 12-1, 12-2 . . . 12n. Each of the flow detectors 12-$i$ is operatively coupled to a respective conduit Ci to detect a fluid flow Fi therein. An indication of this fluid flow can be provided at a respective output port, on lines 14-1, 14-2 . . . 14-n in the form of an electrical signal. For example, in a no flow condition, a normally open contact or a normally closed contact closure can be provided with a respective change of state produced by the flow Fi.

For purposes of maintenance each detector, such as detector 12-$i$, has associated with it a respective test unit 20-$i$. Associated with each respective test unit 20-$i$ is a pump 22-$i$ electrically coupled to the respective test unit 20-$i$. Each of the pumps can draw fluid from and return fluid to the respective conduit C-$i$ to create test flow Fit by means of a respective test flow input conduit 24-$i$ and a respective test flow output conduit 26-$i$ via an output 14'-$i$.

The respective output signal on the line 14-$i$ can in turn be coupled directly to the respective test unit 20-$i$. Alternately the output signal can be coupled to a system control unit indicated generally at 16 via an output 14'-$i$. Control unit 16 in turn can respond to the detected fluid flow by energizing alarm output devices 16a.

Each of the test units 20-$i$ incorporates a manually operable control element 30-$i$. This element might be a multi-position key switch, for example, or a keypad or card reader. Using the control element 30-$i$ the respective test unit 20-$i$ can be placed into an active state whereupon the respective pump 22-$i$ will be activated.

Hence, in the active state, the respective test unit, 20-$i$ can energize pump 22-$i$ and produce a flow of fluid Fit in the vicinity of the respective flow detector 12-$i$. The detector 12-$i$ will in turn, upon detecting the test flow, output a test signal from its output port on line 14-$i$ which is in turn sensed by test unit 20-$i$.

One output from the respective detector 12-$i$ can be coupled to the respective test unit 20-$i$. The other can be directly coupled to the control element 16 as required.

A selected test mode can be entered at unit 12-$i$ by a manual input at the respective control element 30-$i$. Alternately control unit 16 can issue an appropriate command or commands to the respective test unit.

In addition to individually actuating each of the units 20-$i$, group testing can be implemented. Test units can be coupled together, based on groups of detectors, indicated by signal paths 32-1 . . . 32-$n$–1. In such an instance, the system will support a mode of multiple unit, group, activation.

A single control signal, from, for example, element 30-1 or control unit 16 can activate test unit 20-1 to carry out a selected type of test. This activation can in turn be coupled to test unit 20-2 and on to test unit 20-$n$, assuming they are in the same group, causing those respective units to carry out the same type of test in response to a single initiating control signal.

Various types of test unit outputs can be initiated. For example, the respective test unit can actuate the respective pump, for example once a week, for a brief period of time such three hundred milliseconds. In another mode, the respective test unit can be placed into a self-test mode whereupon the respective pump will be energized continuously until the test unit is taken out of that mode. Finally, a group test can be carried out wherein when a selected test unit, such as unit 20-$i$ is activated, those units to which the activated test unit is coupled, via signals 32-$i$ will also be tested in the same fashion. For example, in group test, a continuous test output can, in a preferred embodiment, be produced until the unit is released manually.

Figure 2:
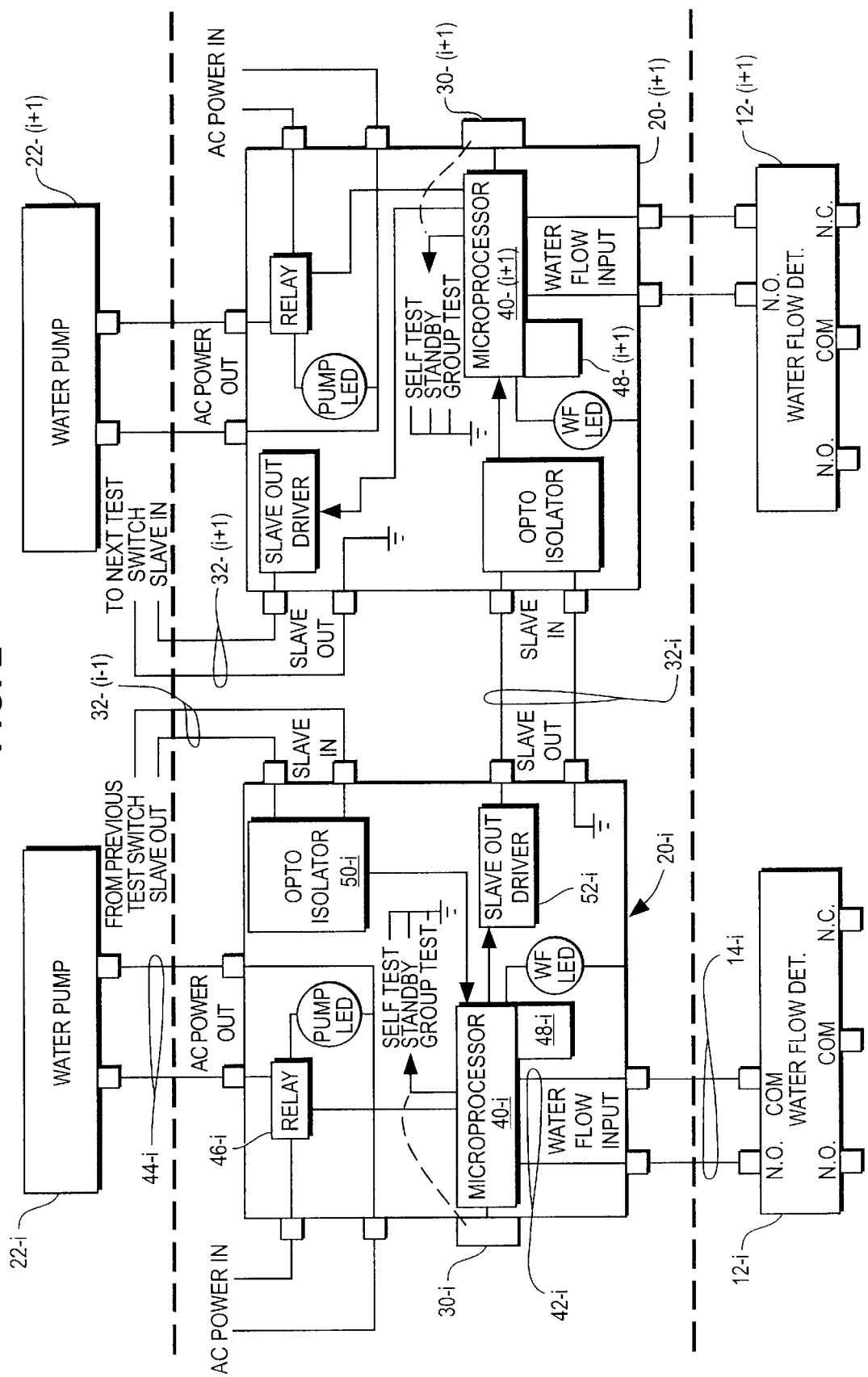
FIG. 2 is a block diagram illustrating details of the test units of FIG. 1.

FIG. 2 illustrates in greater detail, in block diagram form, the structure of respective test units such as 20-$i$ and 20-$i$+1. Elements in FIG. 2 which are common with those in FIG. 1 have been assigned a corresponding identification numeral.

The following discussion of test unit 20-$i$ is applicable to the remaining test units so only unit 20-$i$ needs to be discussed. The test unit 20-$i$ includes a programmable processor, such as a microprocessor, 40-$i$. An input port of the processor 40-$i$, indicated generally at 42-$i$, is coupled to the output port of the respective flow detector 12-$i$.

An output port 44-$i$ is coupled to the respective water pump 22-$i$. Output drive circuitry, which could be implemented as either a relay or a solid state switch, indicated generally at 46-$i$ provides interface circuitry between processor 40-$i$ and waterpump 22-$i$.

Coupled to processor 40-$i$ is a storage unit 48-$i$ which could be integral therewith wherein instructions executable by processor 40-$i$ are stored. Storage units can be implemented as RAM, ROM, EEPROM or the like without limitation. Execution of these instructions enables processor 40-$i$ to carry out different processing sequences based on the setting of input control element 30-$i$, or, based on signals received from another test unit on communication lines 32-($i$–1).

An optical isolator 50-$i$ can be interposed between the communication lines 32-($i$–1) and processor 40-$i$ for isolation purposes. Additionally, output drive circuitry 52-$i$ can be provided between processor 40-$i$ and output communication lines 32-$i$. This circuitry is in turn coupled to test unit 20-($i$+1).

It will be understood that a variety of control programs can be loaded into the storage unit or memory 48-$i$ without departing from the spirit and scope of the present invention. However, irrespective of how implemented, such control programs will enable the respective test unit 20-$i$ to energize the respective pump 22-$i$ and receive or sense signals from the respective detector 12-$i$ in accordance with the selected operational or test mode.

Figure 3:
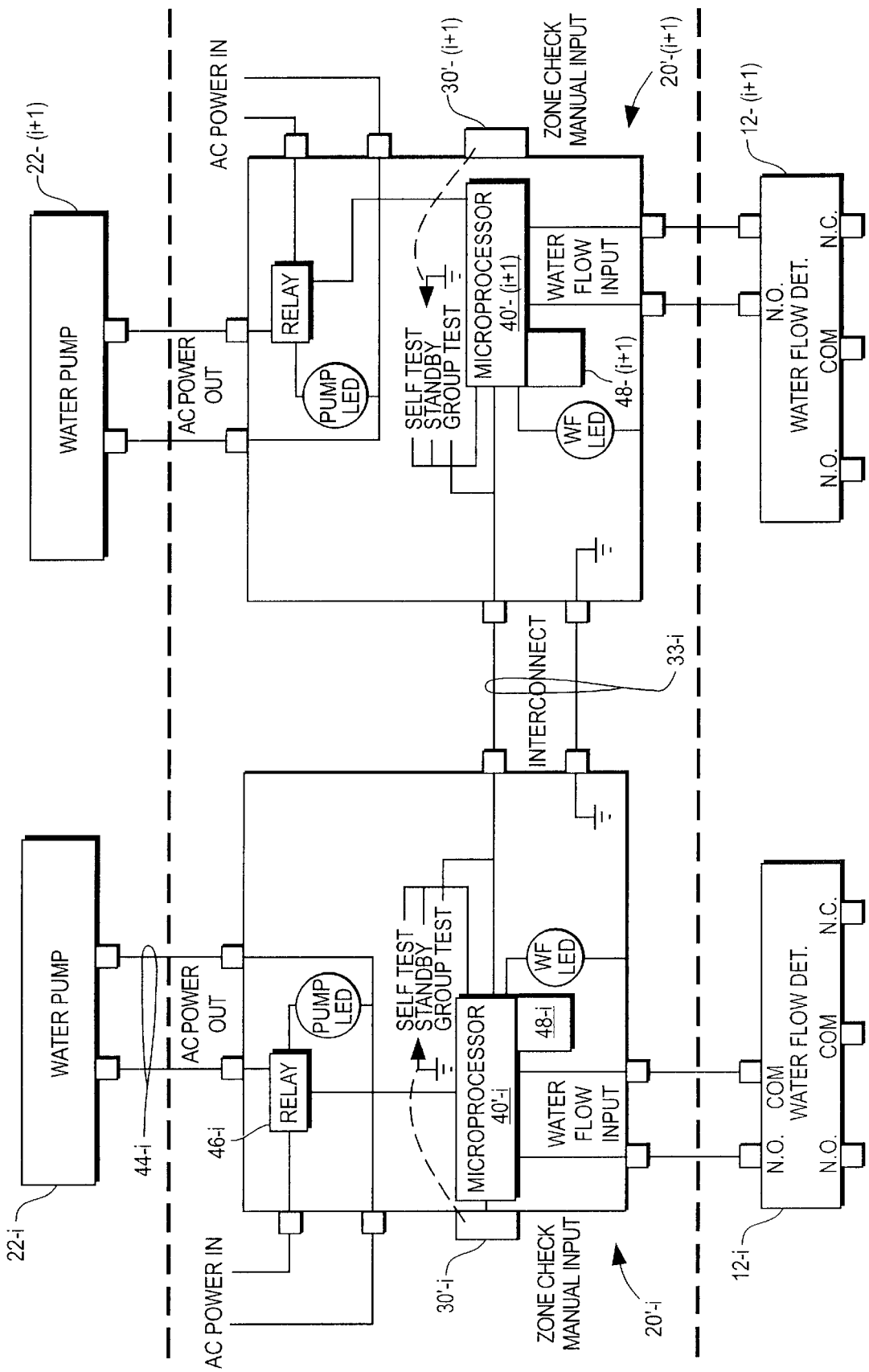
FIG. 3 is a block diagram illustrating an alternate configuration of the system of FIG. 2.

FIG. 3 illustrates an alternate implementation, in block diagram form, of system 10 of FIG. 1. Elements in FIG. 3 which are common with those in FIGS. 1 or 2 have been assigned a corresponding identification number.

Unlike the system of FIG. 2, in the system of FIG. 3, test units such as 20'$i$ and 20'$i$+1, when in a common group, can be coupled together using a two wire interconnect 33-$i$. In each instance, a respective processor such as 40'-$i$ and 40'-$i$+1 has a group test input port connected to the two wire interconnect system 33-$i$. In this embodiment, all members of one group would be coupled to interconnect 33-$i$ as illustrated in FIG. 3. Setting a respective test unit 20-$i$ in the group into a group test mode using manual input 30-$i$ will cause an appropriate signal to be transmitted via the two wire interconnect 33-$i$ to all group members. As a result, group members will carry out an essentially simultaneous group test of the respective water flow detector, such as the detector 12-$i$.

It will be understood that as an alternate to initiating the group test mode using the manual input device 30-$i$, a command can be initiated from the control element 16 to carry out a group test. In this instance, a specific group would be identified by the control element 16. The test units 20-$i$ in each group would recognize that they are part of the specified group for carrying out the required test.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A system for testing a flow detector comprising:
    a programmable processor having a detector signal input port and a test initiating output port;
    output drive circuitry coupled to the test initiating output port;
    executable instructions coupled to the processor wherein in response to an initiation signal, the processor executes selected instructions and thereby energizes the output drive circuitry to initiate a test operating cycle of a respective detector and wherein the processor, in response to executing different instructions, senses at the input port an electrical signal, from the detector, indicative of test results.

2. A system as in claim 1 which includes additional executable instructions for initiating a test cycle for at least one additional flow detector.

3. A system as in claim 1 wherein the instructions are stored in a memory unit coupled to the processor.

4. A system as in claim 1 wherein the output drive circuitry includes an output drive element selected from a class which includes an electro-mechanical switch and a solid state switch.

5. A system as in claim 4 wherein the electro-mechanical switch comprises a relay.

6. A system as in claim 1 which includes a manually settable selection element, coupled to the processor, for specifying an operating mode.

7. A system as in claim 6 wherein the selection element comprises a multi-position switch.

8. A system as in claim 1 wherein the instructions comprise a plurality of operating modes.

9. A system as in claim 8 wherein an operating mode can be specified by a manually settable control element coupled to the processor.

10. A system as in claim 9 wherein the control element is selected from a class which includes a multi-position switch, a keypad and a reader.

11. A system comprising:
a flow detector having an output port;
a test apparatus, coupled to the output port, wherein the test apparatus includes at least one test flow conduit for providing a test flow for the detector and a processor programmed with executable instructions for sequentially providing the test flow and for sensing a test feedback signal from the detector.

12. A system as in claim 11 which includes a plurality of executable sequencing instructions coupled to the processor.

13. A system as in claim 11 which includes a pump coupled to the test flow conduit and electrically coupled to the processor.

14. A system as in claim 13 which includes executable instructions, coupled to the processor, for energizing the pump to provide test flow for the detector and additional instructions for sensing an output signal from the detector.

15. A system as in claim 14 which includes executable instructions for sensing a control sequence specifying signal.

16. A system as in claim 11 which includes a manually operable mode specifying input device.

17. A system as in claim 16 wherein the mode can be selected from a class which includes a relative brief pump cycle mode, a self-test mode and a group test mode.

18. A system as in claim 17 which includes a set of executable instructions associated with each mode.

19. A system as in claim 18 which includes an output couplable to another, substantially identical system wherein the two systems can both be tested in the group test mode.

20. A fluid flow detection system comprising:
a plurality of flow detectors;
a plurality of substantially identical test units, each coupled to a respective detector, wherein each of the test units includes a flow conduit with a flow inducing transducer coupled thereto and configured to cause test fluid flow in the vicinity of a respective detector to thereby cause that detector to go from a quiescent to a test state in response to the fluid flow, and, a processor programmed with executable instructions for energizing the transducer and for sensing an output from the respective detector.

21. A system as in claim 20 wherein at least some of the test units include a test unit input coupling port and a test unit output coupling port wherein an output port of one unit is coupled to an input port of another.

22. A system as in claim 21 wherein the unit includes executable instructions for sensing a signal at an input port and in response thereto, energizing the respective transducer.

23. A system as in claim 22 wherein the unit includes instructions to transmit a test initiating output signal, via the output port, to another unit.

24. A system as in claim 21 which includes a manually operable control element, coupled to at least one test unit, for selecting an operating mode.

25. A system as in claim 24 wherein the control element is selected from a class which includes a multiple position switch, a multi-key keyboard and a card sensor.

26. A system as in claim 24 wherein at least one test unit includes executable instructions responsive to the control element for carrying out a selected operating mode.

27. A system as in claim 24 wherein the executable instructions selectively carry out at least one of a periodic transducer activation, a self-test and an initiation of multiple unit tests.

28. A system as in claim 27 wherein the transducer activation is for an interval less than one second.

29. A system for testing a flow detector wherein the detector senses flow in a conduit and produces a detector output signal indicative thereof, comprising:
a programmable processor having a detector signal input port and a test initiating output port;
output drive circuitry coupled to the test initiating output port;
executable instructions coupled to the processor wherein in response to an initiation signal, the processor executes selected instructions and thereby energizes the output drive circuitry to initiate a test operating cycle of a respective detector and wherein the processor, in response to executing different instructions, senses at the input port an output signal, from the detector, indicative of test results.

30. A system as in claim 29 which includes additional executable instructions for initiating a test cycle for at least one additional flow detector.

31. A system as in claim 29 wherein the output drive circuitry includes an output drive element selected from a class which includes an electro-mechanical switch and a solid state switch.

32. A system as in claim 29 which includes a manually settable selection element, coupled to the processor, for specifying an operating mode.

33. A system for operating and testing a detector which senses a flow of fluid and which produces an electrical output signal indicative thereof comprising:
control circuitry having a detector signal input port and a test initiating output port;
output drive circuitry coupled to the test initiating output port; and
circuitry for generating a test initiation signal wherein in response to the initiation signal, the control circuitry energizes the output drive circuitry to initiate a test operating cycle of a respective detector and wherein the control circuitry senses at the input port an electrical output signal, from the detector, indicative of test results.

34. A system as in claim 33 which includes a programmable processor and executable instructions for initiating a test cycle.

35. A system as in claim 34 wherein the instructions are stored in a memory unit coupled to the processor.

36. A system as in claim 33 wherein the output drive circuitry includes an output drive element selected from a class which includes an electro-mechanical switch and a solid state switch.

37. A system as in claim 33 which includes a manually settable selection element, coupled to the processor, for specifying an operating mode.

38. A system as in claim 37 wherein the selection element comprises a multi-position switch.

39. A system comprising:

a flow detector having an output port and an element for sensing fluid flow;

a test apparatus, coupled to the output port, wherein the test apparatus includes at least one test flow conduit for providing a test flow for the detector and control circuitry for sequentially initiating the test flow and for sensing a test feedback signal from the output port of the detector.

40. A system as in claim 39 which includes a programmable processor and a plurality of executable sequencing instructions coupled to the processor.

41. A system as in claim 39 which includes a pump coupled to the test flow conduit and electrically coupled to the processor.

42. A system as in claim 40 which includes executable instructions, coupled to the processor, for energizing a pump to provide test flow for the detector and additional instructions for sensing the signal from the detector.

43. A system as in claim 39 which includes a manually operable test specifying input device.

44. A system as in claim 43 wherein the test can be selected from a class which includes a relative brief pump cycle mode, a self-test mode and a group test mode.

45. A system as in claim 44 which includes a processor and a set of executable instructions for carrying out at least one type of test.

46. A system as in claim 45 which includes an output couplable to another, substantially identical system wherein the two systems can both be tested in the group test mode.

47. A test unit for a fluid flow detector comprising:

a flow conduit with a flow inducing transducer coupled thereto and control circuits coupled to the transducer and configured to cause test fluid flow in the vicinity of a respective detector to thereby cause that detector to go from a quiescent to a test state in response to the fluid flow, including circuitry for sensing a flow indicating output from the respective detector.

48. A test unit as in claim 47 wherein the transducer comprises an electrically energizable pump.

* * * * *